United States Patent Office 3,342,514
Patented Sept. 19, 1967

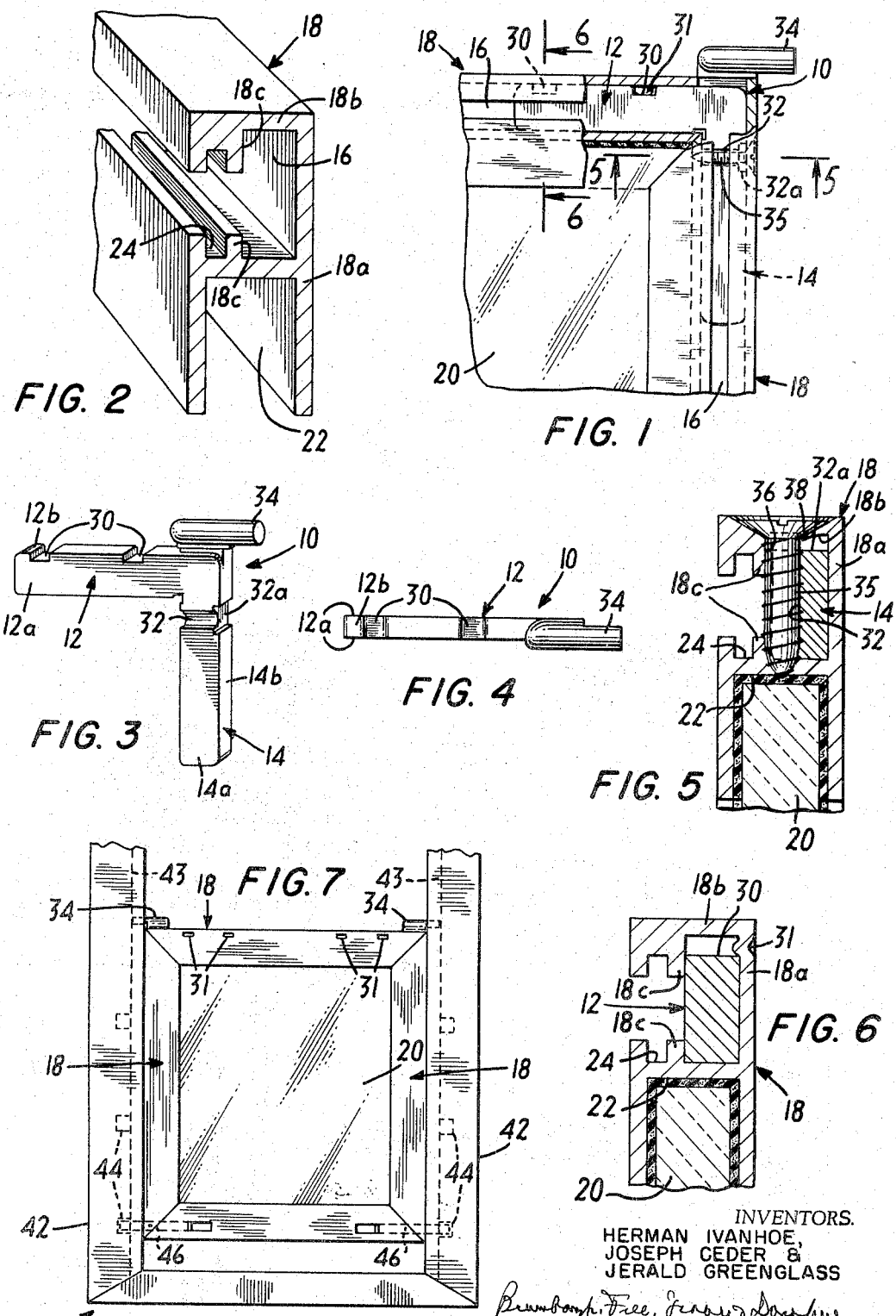

3,342,514
FRAME CORNER STRUCTURE
Herman Ivanhoe, Tenafly, Joseph Ceder, Bloomingdale, and Jerald Greenglass, Oradel, N.J., assignors to Win-Chek Industries, Inc., Moonachie, N.J., a corporation of New Jersey
Filed Mar. 31, 1965, Ser. No. 444,280
2 Claims. (Cl. 287—189.36)

ABSTRACT OF THE DISCLOSURE

Improvements in corner constructions for extruded window frames, sash frames and the like, characterized by and L-shaped corner member, one leg of which can be secured in a channel in one frame member, and the other leg having a groove in one side thereof for receiving a screw inserted through another right-angularly related frame member, to secure the frame members together and force them into friction-tight engagement.

---

The invention relates to the construction of window frames and the like, and more particularly to an improved corner structure for metal frame members.

Many window, screen, and storm sashes are today constructed from extruded metal frame members, such as aluminum extrusions. In order to maximize production efficiency, such frame members should be capable of fast assembly requiring as few steps as possible; at the same time, the frame construction must permit disassembly of the members for replacing the glass, screen, or other enclosure material when necessary. Of the many extrusion shapes used for window fabrication, the extrusions best suited for this purpose are those having longitudinal channels running throughout the length of the extrusion. This type of frame extrusion is very light in weight and need not sacrifice structural strength.

Several of the window frame constructions employing longitudinally channeled frame members utilize corner brackets for joining two frame members. Among these constructions are those which use a metal bracket into which screw holes have been tapped for receiving screws inserted through the channeled face of a frame member. When this structure is used, the frame is rigidified when the binder head screws are tightened into the tapped screw holes in the bracket. The reaction forces resulting from the tightening of the screw draw the bracket against an inside surface of the longitudinal channel into which the bracket is inserted, the underside of the screw head providing frictional force against the outside surface of the channeled frame face. This type of corner structure, although satisfactory, exposes an open channel running the length of the frame members and suffers instability should a screw become slightly loosened. Moreover, unsightly screw heads are visible along the face of the frame. Another known corner structure uses a bracket which is similarly inserted into the longitudinal grooves or channels in the frame members. This bracket is notched at the inside edge of the bracket legs for accepting pins and the like inserted through the faces of the frame members. The rigidity of this corner structure depends on the flexing of the bracket about its apex as pins or screws are inserted through the faces of the members. This structure is disadvantageous because any slight wear of the metal about the pins or screws causes the structure to become somewhat unstable. Also, production tends to be slower and more expensive.

These and other disadvantages of known frame constructions are overcome by providing longitudinally channeled frame members for receiving a novel bracket. The bracket comprises two angularly disposed legs, one of which has notches along an outside edge adaptable to machine peening of the frame member. The other leg is transversely grooved along one of its faces for receiving fastening means engaging the sides of the frame member.

Further, the corner structure, according to the invention, provides a frame construction which is extremely rigid, economically assembled, and quickly disassembled for replacement of the window closure material. Also, the esthetic appearance of the frame is preserved, since no unsightly screw heads and the like are visible when the frame is in use.

For a better understanding of the invention, reference may be made to the following detailed description, taken in conjunction with the drawings, in which:

FIGURE 1 is a cut-away front elevation of a frame corner constructed in accordance with the invention;

FIGURE 2 is a typical frame member suitable for use with the invention;

FIGURES 3 and 4 are perspective and top views, respectively, of a preferred embodiment of a corner bracket in accordance with the invention;

FIGURE 5 is a sectional view taken along the line 5—5 of FIGURE 1;

FIGURE 6 is a sectional view taken along the line 6—6 of FIGURE 1;

FIGURE 7 is a front elevation of a window sash constructed in accordance with the invention and shown within an outer window frame.

Turning to FIGURE 1, the invention includes a bracket 10 having legs 12, 14 slidably received in longitudinal channels 16 within the frame rails, or members 18. A glass closure is indicated generally at 20.

FIGURE 2 illustrates the structural details of a typical extruded metal frame member, or rail, suitable for use for the invention. The longitudinal channel 16 accepts a leg of the bracket 10, whereas a groove 22 receives the closure material, such as the glass window pane 20. Another groove 24 can be formed in any of the frame rails for accepting weather-sealing material, such as a strip of rubber or tufted material, either of which is commonly used for weather sealing between the adjacent members of the upper and lower window sashes.

A preferred embodiment of the bracket is shown in FIGURES 3 and 4. As stated above, the bracket comprises two solid legs 12, 14 disposed in angular relationship. Of course, the angle formed between the two legs of the bracket need not be a right angle, as shown, but can be any angle conforming to the angle between the frame members to be joined. In the bracket shown, two notches 30 are formed along the outside edge of one of the legs 12. These notches, when the leg 12 is inserted in the frame member channel 16, as shown in FIG. 1, can receive indentations formed by peening and the like in the face 18a or side 18b of the frame member. The advantage gained by this type of bracket construction is the ease with which the bracket 10 may be secured to one of the frame members. Since the peening indentations 31 can be formed by machine, manual assembly of bracket leg 12 and the top frame member 18 is eliminated. The other leg 14 of bracket 10 includes at least one groove 32 extending laterally, or transversely of the direction of the length across the face 14a of leg 14. A notch 32a in the outer edge 14b of leg 14 is also preferable, for reasons that will be explained shortly.

The preferred embodiment of the bracket includes, additionally, an integral projecting element 34, preferably cylindrical, projecting parallel with the bracket leg 12 and beyond the side of the assembled frame as can best be seen in FIG. 1. Brackets having this projecting element can be employed at the top or bottom corners of a window frame, or both if desired. These elements cooperate with grooves running the length of the vertical rails of an outer frame. Thus, a sash such as that illustrated in FIG. 1 can be slidably received within an outer frame by means of the projecting elements 34 which may also serve as pivots to enable the sash to swing out for cleaning and the like. The structural relationship between an outer frame and a window sash frame is shown in FIG. 7, and is discussed below.

Referring now to FIGURE 5, the cross-section view shows the interaction among the frame member 18, the bracket leg 14, and a screw 35 inserted through a hole 36 drilled in the frame member generally perpendicular to the frame sides and engaging the groove 32 and the sides 18b of the frame member 18. As illustrated, the screw 35 preferably engages the slotted inner face 18c of the channel 16. The screw 35 is preferably a bevel-head type, so that the screw, when in the assembled position, lies flush with or below the outside surface of the channel side 18b.

It can be observed from FIGURE 5 that the interaction among the frame members, the bracket, and the fastening means, affords an extremely rigid structure. The screw 35 urges bracket leg 14 against the inside surface of the outer face 18a of the channel, whereas, referring to FIG. 6, the peening indentations 31 in the other frame member urge the bracket leg 12 against the inside surface of inner face 18c of the channel. The oppositely-directed forces created by the fastening means acting in this manner provides a superior corner structure which resists unwanted loosening through use. It is noted that the bracket 10 need not flex about the apex of the bracket, and since the bracket is dimensioned for a slidable close fit within the frame member of channel 16, extremely little bending of the bracket occurs. Any tendency of the frame face to wear away about the screw 35 is eliminated, since the bracket leg 14 and the faces and sides of the channel 16 form an essentially solid block surrounding the screw.

When the frame material is relatively thin, as may be the case for small frames, there may not be sufficient side thickness to accommodate the entire screw head. However, if a notch 32a is formed in the edge 14b of the bracket leg 14, then a slight inward bending of the face material about the hole 36 will allow the screw to seat flush with the outside surface of the side 18a, or if desired, the hole may be countersunk to a greater depth so that the screw head itself is accommodated by the notch 32a. The inwardly deflected material, indicated at 38, is in turn accommodated by the notch 32a.

FIGURE 7 illustrates the arrangement of a window sash, constructed in accordance with the invention, within an outer frame 40. The vertical rails 42 of the outer frame contain channels 43 opening to the inside of the frame opening. These channels receive the projecting elements 34 integral with the preferred embodiment of the bracket 10. Vertically spaced notches 44 appear in the bottom of groves 43, for accepting spring-biased latches 46 which support the window frame when it is in a raised position, as shown. When the spring-biased latches 46 are withdrawn into the lower frame member of the window frame, the window frame may be rotated about the projecting elements 34 within the channels 43, and may also be removed by tilting the window frame until the projecting elements are clear of the outer frame channels 43.

The bracket is readily manufactured by casting, and may be made from a variety of metallic and synthetic materials. Plastics, which are easily and cheaply molded, have been found to be very satisfactory in fabricating the corner structure brackets. Moreover, no tapping and drilling or other machining operations are required for the bracket, thus further enhancing the economy of production.

The embodiments of the invention described herein are illustrative only. Many variations and modifications may be made by one skilled in the art without departing from the spirit and scope of the invention. All such variations and modifications, therefore, are intended to be included within the scope of the appended claims.

We claim:
1. A corner structure for window frames and the like comprising a bracket having angularly disposed legs, each of the legs being solid and having faces and edges, frame members having longitudinally extending rectangular channels formed by opposed sides and faces for slidably receiving the legs of the bracket, one of said legs having at least on notch in one of the edges thereof, the other of said legs having a least one groove in at least one of the faces and extending transversely to the direction of the length thereof, first fastening means engaging the notch and one of the faces of a frame member, and second fastening means engaging the groove and the sides of the other frame member, said second fastening means frictionally engaging the face of said other frame member to thereby urge the other face of the other bracket leg into contact with the inner surface of the opposed face of said other frame member, said other bracket leg having a notch in the outer edge thereof communicating with said groove, said notch accommodating any deformation of the outer side of said other frame member caused by said second fastening means.

2. A corner structure for window frames and the like comprising a bracket having angularly disposed legs, each of the legs being solid and having faces and edges, frame members having longitudinally extending rectangular channels formed by opposed sides and faces for slidably receiving the legs of the bracket, one of said legs having at least one notch in one of the edges thereof, the other of said legs having at least one groove in at least one of the faces and extending transversely to the direction of the length thereof, first fastening means engaging the notch and one of the faces of a frame member, and second fastening means engaging the groove and the sides of the other frame member, said second fastening means frictionally engaging a face of said other frame member to thereby urge the other face of the other bracket leg into contact with the inner surface of the opposed face of said other frame member, said first and second fastening means engaging opposite faces of the respective frame members to thereby urge the respective bracket legs in opposite directions against the faces of the frame members.

References Cited
UNITED STATES PATENTS

| | | | |
|---|---|---|---|
| 2,965,935 | 12/1960 | Olsen | 287—189.36 X |
| 2,972,395 | 2/1961 | Peremi | 287—189.36 |
| 3,080,621 | 3/1963 | Mendelsohn | 287—189.36 X |
| 3,162,282 | 12/1964 | Mendelsohn | 287—189.36 X |
| 3,202,245 | 8/1965 | Tarte | 287—189.36 |

DAVID J. WILLIAMOWSKY, *Primary Examiner.*

HARRISON R. MOSELEY, *Examiner.*

P. C. KANNAN, *Assistant Examiner.*